(No Model.) 3 Sheets—Sheet 1.
J. F. PICKERING.
MEANS FOR CULTIVATING PLANTS.
No. 549,656. Patented Nov. 12, 1895.
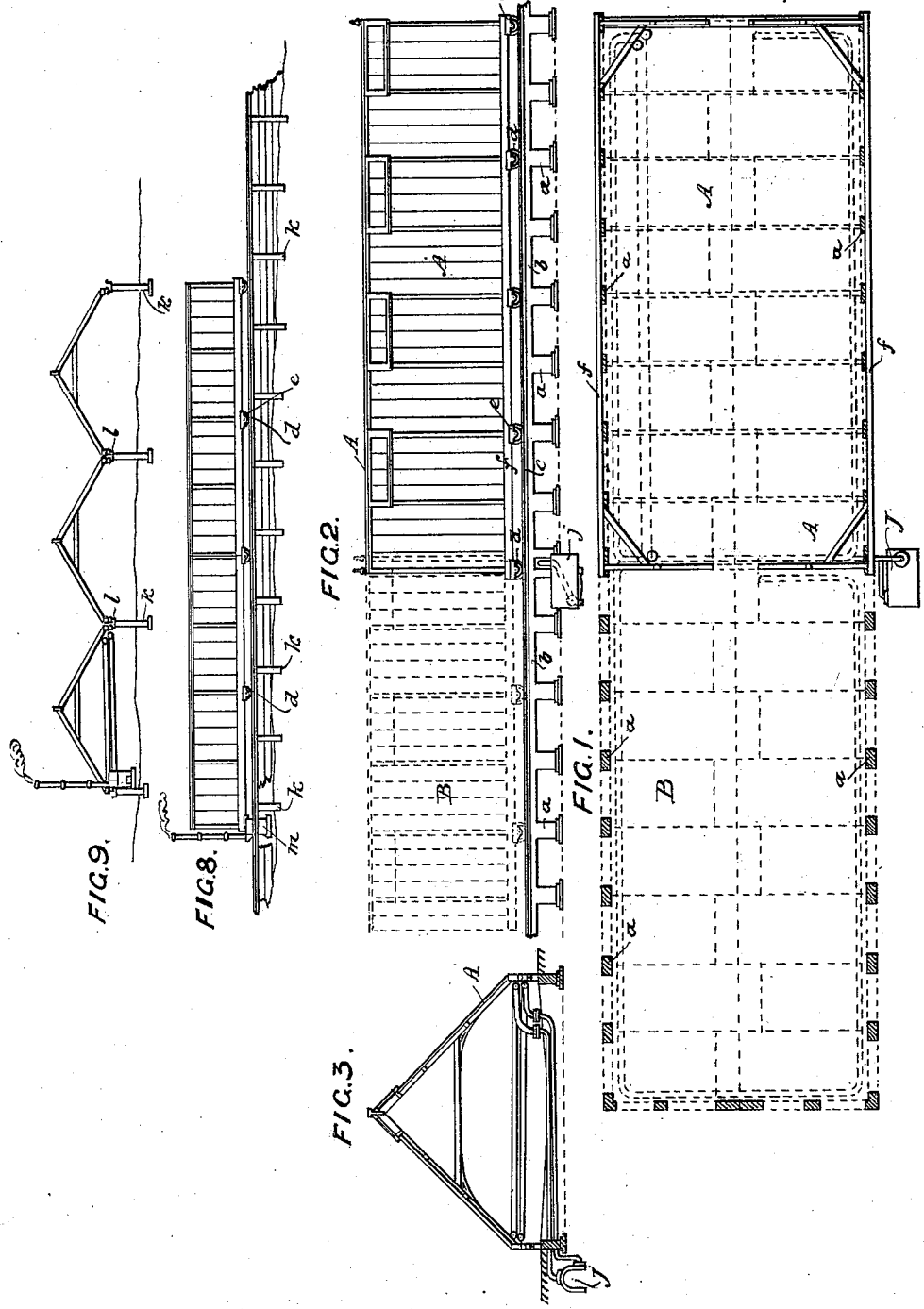
Witnesses:-
Fred Haynes
George Barry Jr.
Inventor
John Foster Pickering
by attorneys
Brown & Seward

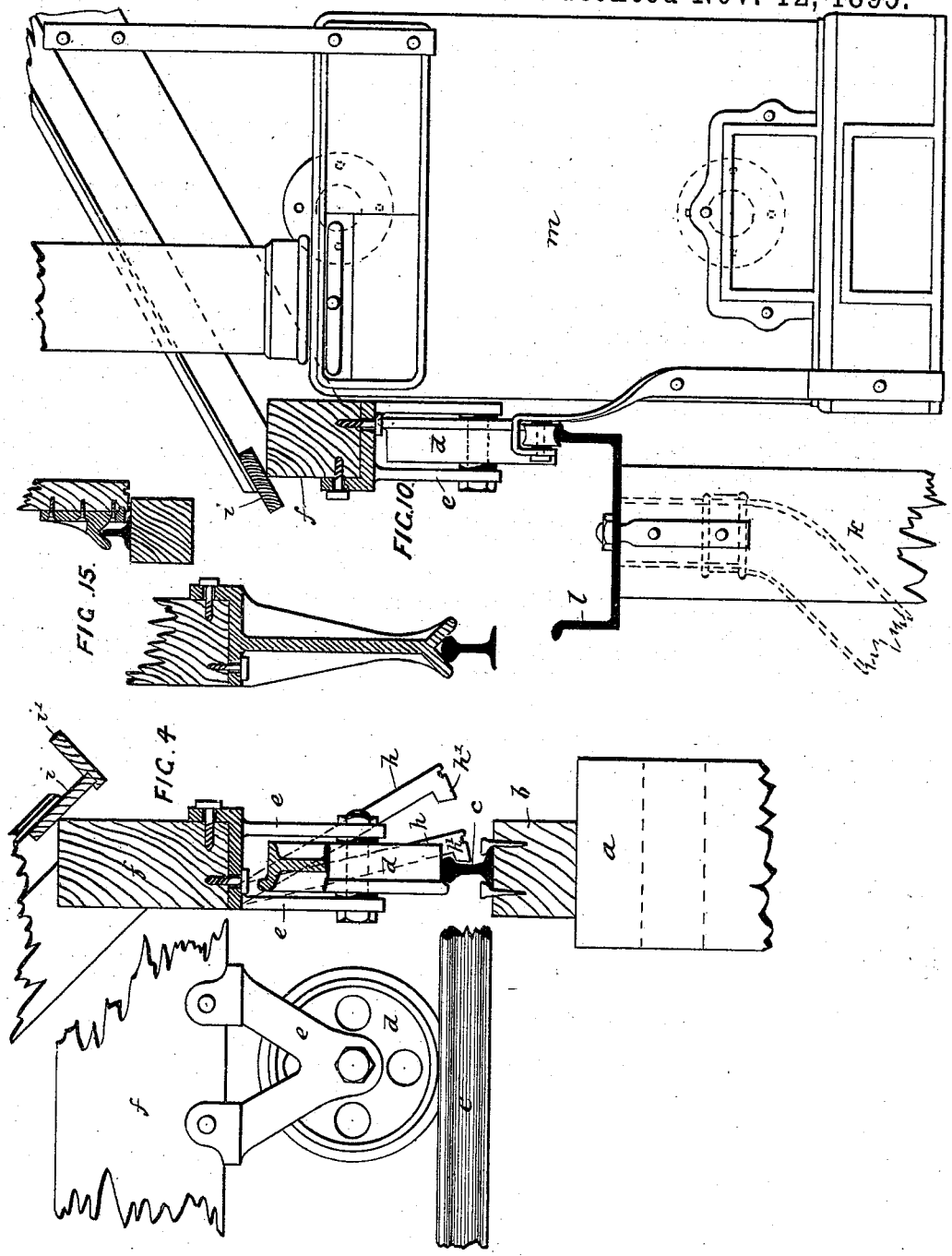

(No Model.) 3 Sheets—Sheet 3.
J. F. PICKERING.
MEANS FOR CULTIVATING PLANTS.
No. 549,656. Patented Nov. 12, 1895.
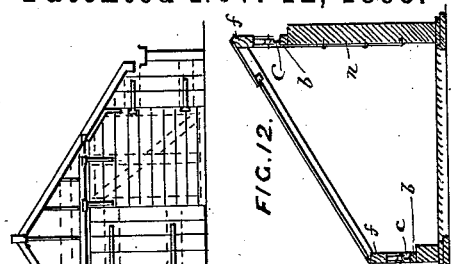
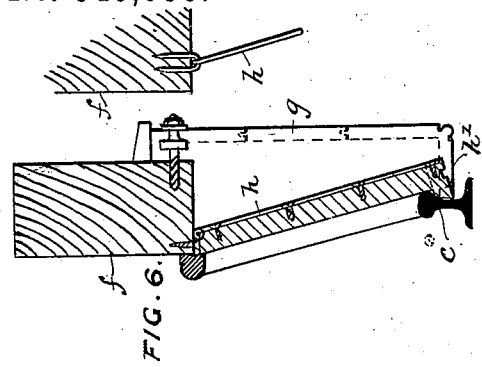
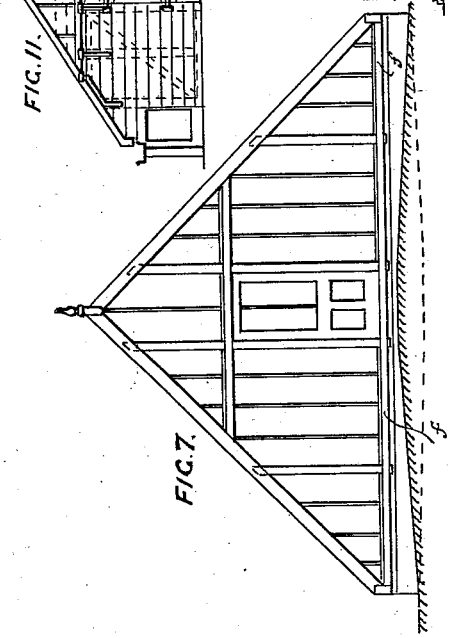
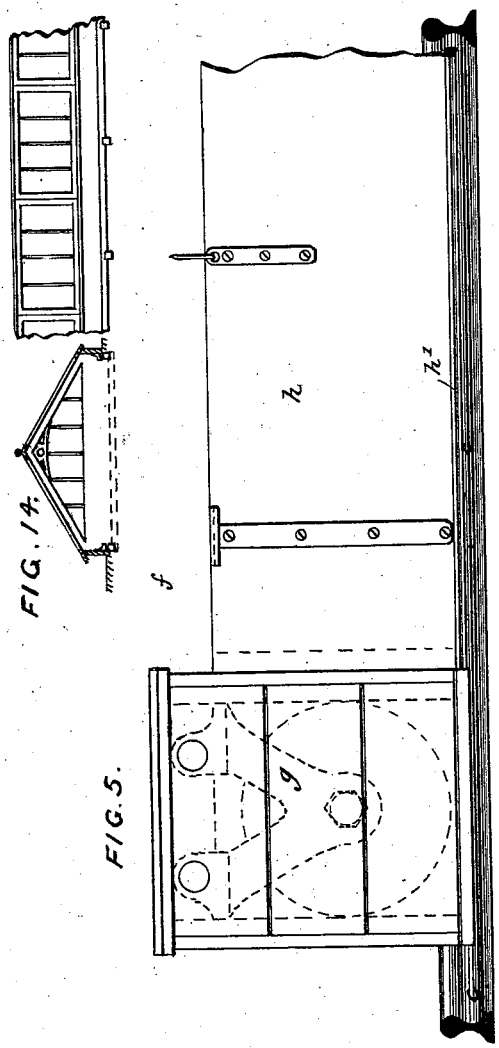
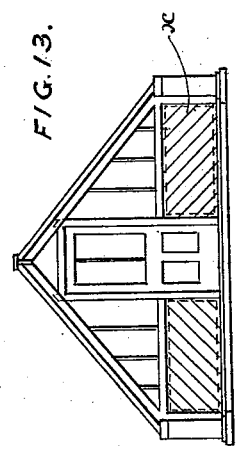
Witnesses:—
Fred Haynes
George Barry Jr.
Inventor:—
John Foster Pickering
by attorneys
Brown & Seward

UNITED STATES PATENT OFFICE.

JOHN F. PICKERING, OF CHISELHURST, ENGLAND.

MEANS FOR CULTIVATING PLANTS.

SPECIFICATION forming part of Letters Patent No. 549,656, dated November 12, 1895.

Application filed July 28, 1894. Serial No. 518,818. (No model.) Patented in England February 24, 1894, No. 3,993, and in Belgium May 5, 1894, No. 109,801.

*To all whom it may concern:*

Be it known that I, JOHN FOSTER PICKERING, of St. Aloes, Chiselhurst, in the county of Kent, England, have invented a certain new and useful Improved Means for Cultivating Plants, (patented to me in Great Britain by Patent No. 3,993, dated February 24, 1894, and in Belgium by Brevet d'Invention No. 109,801, dated May 5, 1894,) of which the following is a specification.

This invention relates to the cultivation of fruit, flowers, vegetables, and other plants for the market or private use in a more satisfactory manner than heretofore.

In the accompanying drawings, Figure 1, Sheet I, is a plan view, Fig. 2 is a side elevation, and Fig. 3 a cross-section, illustrating my invention as applied, say, to the cultivation of vines. Figs. 4 and 4ª, Sheet II, and Figs. 5 and 6, Sheet III, are details of construction which will be more particularly referred to hereinafter; and Fig. 7, Sheet III, shows the end view of a house. Fig. 8, Sheet I, is a side elevation, and Fig. 9 a cross-section, showing my invention as applied for field use, Fig. 10, Sheet II, showing details of construction to be more particularly referred to. Fig. 11, Sheet III, represents in elevation an end which may be used with the field arrangement. Fig. 12 is a cross-section showing the invention as applied to a "lean-to" roof. Fig. 13 shows another form of house end which may be applied for the purposes of my invention. Fig. 14 represents in side elevation and cross-section a very light form of horticultural structure adapted to slide on skids, and Fig. 15 shows details of construction.

In the growing of fruit, flowers, vegetables, and other plants for market the difficulty is to obtain a succession of crops without incurring such expense as to make the growing unprofitable. In some cases—for instance, in vine culture—a number of vineries or greenhouses are employed, which are successively brought into operation and thus a succession of crops can be obtained, and as grapes always bring a comparatively high price in the market the expense of this plan is of little moment; but such an arrangement is not suitable for the cheaper kinds of fruit and flowers. Even in vine culture the houses have to be left open for a considerable part of the year to give the vines the proper period of rest, and the houses are therefore practically useless for other purposes, thus making the expense of growing grapes greater than need be. There are also many decorative plants which it is desirable to leave in the open air for various periods of time and at certain seasons and which when about to bloom require heat, and the labor necessary to shift the plants into and out of the houses is enormous.

In the ordinary growing of vegetables and the smaller fruits in the open air the crops come on all at once, producing a glut in the market and consequent reduction of prices. The forcing of vegetables and some fruits is now carried out, but only on a small scale, by means of small frames, lights, or glasses, and it will be obvious that to do this on a large scale with the means at hand is practically impossible, on account of the amount of labor which would be involved thereby and the cost of the same. The earth in greenhouses is also liable to become foul and stale, because it is not subjected to the cleansing action of the atmosphere in the same way as the open ground. This necessitates the removal of a great portion of the earth from time to time, with possible injury to the trees or plants, vines, or otherwise, which are permanently planted therein.

I have mentioned above only a few of the disadvantages of the present systems of culture, but there are many others which will be evident to horticulturists.

Now the object of the present invention is to obtain the desired result of succession crops and other advantages without the disadvantages hereinbefore enunciated, and others not mentioned, but well known. To this end I set out in a plot a multiplicity of plants in such positions that suitably long ranks or ranges of them may be brought in bulk under glass for forcing purposes, as required, and I provide a glass structure which may be conveniently shifted bodily to different parts of the plot, such structure being provided or not with a heating apparatus. It is in this structure and its appurtenances, hereinafter described and claimed, that my invention consists.

Referring now to Figs. 1, 2, and 3, Sheet I,

A represents a vinery or greenhouse, and B indicates in dotted lines the position it will assume when shifted. In general, one shift will be sufficient in a house of the class indicated, but I may provide for two shifts. In arranging the houses I should erect a house, say, at one end of a garden, leave a space equal to one or two shifts, and then erect another house, a further space or spaces being left on the other side, and so on. In this way I make one house do the duty of two or three, because when one crop of grapes has been cut the house may be shifted in order to bring on a second crop or to use the house for another purpose, the vines being thus placed in the open air after bearing, that they may have the period of rest so essential to the best class of vine culture.

In arranging the house for the purposes of my invention I proceed as follows: I build a number of piers $a$ $a$, in brick or concrete, all to the same level, with proper footings and at convenient distances apart. Upon these piers I fix a "plate" $b$, to which are secured by spikes or in any other convenient manner Vignoles or other rails $c$. (See Fig. 4, Sheet II). These rails form a track for runners $d$, represented as flanged wheels, which carry the glass structure, and will extend permanently the length of the two or three shifts, as the case may be. The wheels $d$ are mounted in suitable brackets $e$, firmly secured to a base-plate $f$, which, being securely braced and bolted together, forms a frame all around, on which the glass structure is erected. The glass structure may be of half-span, full-span, or "lean-to" type, of any form or pitch to suit the requirements. The wheel-brackets $e$ will be permanently boxed in, as indicated at Figs. 5 and 6, Sheet III, the casing $g$ being secured to the base-plate $f$ and fitting against the web of the rail.

$h$ represents a flap which closes in the space between two wheels. This flap is hinged to or hung from the under side of the base-plate $f$ and has at its lower edge a flange or fillet $h'$, which fits under the head of the rail and against the web, as seen in Figs. 5 and 6. The lower rail $i$ (see Fig. 4) of the "light" may form one side of a V-gutter, the other side being a bar or rail $i'$, secured at right angles to the rail $i$.

The ends of the house shown at Fig. 7, Sheet III, are built up in the usual way on the base-plate $f$ and will in most cases be moved with the house.

For a house of the kind above described I secure the hot-water pipes to the framework, so that they may be moved with the house, and a fixed boiler $j$ is suitably placed, say, at the center of the shift, (see Figs. 1, 2, and 3,) the junction between the boiler and the pipes being made in any convenient manner.

For field work I employ a somewhat lighter construction, as indicated at Figs. 8 and 9, Sheet I. In this case I use posts or piles $k$ to carry the plate and rails, and I may combine the plate and rails in one, as shown in Fig. 10, Sheet II—that is to say, I may use a channel-iron $l$, which is firmly bolted to the posts, the wheels $d$ running on the sides of the channel, which are slightly rounded at the top edge to give a better bearing-surface.

As will be seen from Fig. 9, it is proposed to place the glass structures side by side in this arrangement, the two sides of the channel forming the rails or running-surfaces for wheels of two adjacent structures, the channel serving as a gutter from which the water is carried off by downcast-pipes, as indicated at Fig. 10. This construction also lends itself to inequalities in the ground. The space between the rails and the ground will be closed in by boarding, which may be either fixed or removable. The boiler for the heating arrangement may be supported, as indicated in Fig. 10, in which figure the boiler $m$ is slung on one side by a strap $m'$ from a rafter $m^2$, the other side strap $m^3$ being provided with a small roller $m^4$, which runs on the rails $l$.

The ends of the houses may consist of match-boarding and be permanent, or may be made up of flaps $s$, hinged at $s'$, to the framework, as indicated at Fig. 11, Sheet III, so that they can be raised or removed when it is desired to shift the structure.

Fig. 12, Sheet III, illustrates the invention as applied to a lean-to roof against a wall, the same letters of reference referring to corresponding parts. In this case, however, I prefer to brace the plate $b$ to the wall by strong metal braces $n$, placed at suitable distances apart. In place of moving the structure longitudinally it will be obvious that I may arrange the rails or ways so that the structure may be moved bodily laterally without departing from the nature of my invention.

The ends of a house may also be formed, as shown at Fig. 13, Sheet III, the upper part being permanent, the lower part $x$ consisting of flaps, which can be readily removed, as required. The ends may also be mounted on wheels to be shifted bodily laterally to the new position, when the house is arranged to move laterally.

Instead of a glass roof, I may use a dark roof for the cultivation of such plants as do not require light, and in place of running wheels, I may, for a light class of structure, mount the structure on runners consisting of V-skids to slide on the rails. Such a plan is indicated at Fig. 14, Sheet III, in side and sectional views, and in detail at Fig. 15, Sheet II.

Having now particularly described and ascertained the nature of the said invention and in what manner the same is to be performed, I would here remark that it will be evident that the details of construction may be modified considerably without departing from the nature of my invention, and I therefore do not intend to limit myself to the absolute details shown; but

What I claim is—

1. In an apparatus for cultivating fruit, flowers, vegetables or other plants, the combination of a track, a frame furnished with runners to run on said track, and a protecting structure carried by said frame, substantially as herein described.

2. In an apparatus for cultivating fruit, flowers, vegetables or other plants, the combination of a track, a frame furnished with runners to run on said track, a protecting structure carried by said frame and hinged flaps for closing in the spaces between the runners, substantially as herein set forth.

3. In an apparatus for cultivating fruit, flowers, vegetables or other plants, the combination of a track, a movable protecting structure adapted to run on said track and a heating apparatus arranged within said movable protecting structure, substantially as herein set forth.

4. In an apparatus for cultivating fruit, flowers, vegetables or other plants, the combination of a track, a movable protecting structure adapted to run on said track, and a heating apparatus arranged within and movable with said structure, substantially as herein set forth.

5. In a traveling apparatus for cultivating fruit, flowers, vegetables or other plants, the combination with a track and a protecting structure adapted to run thereon, of a steam boiler, a strap for suspending the boiler on one side from said structure and a strap attached to the other side of the boiler and carrying a wheel to run on the track, substantially as herein set forth.

JOHN F. PICKERING.

Witnesses:
H. K. WHITE,
T. F. BARNES.